US007889794B2

(12) United States Patent
Luo et al.

(10) Patent No.: US 7,889,794 B2
(45) Date of Patent: *Feb. 15, 2011

(54) EXTRACTING KEY FRAME CANDIDATES FROM VIDEO CLIP

(75) Inventors: Jiebo Luo, Pittsford, NY (US); Christophe E. Papin, Paris (FR)

(73) Assignee: Eastman Kodak Company, Rochester, NY (US)

( * ) Notice: Subject to any disclaimer, the term of this patent is extended or adjusted under 35 U.S.C. 154(b) by 1352 days.

This patent is subject to a terminal disclaimer.

(21) Appl. No.: 11/346,708

(22) Filed: Feb. 3, 2006

(65) Prior Publication Data

US 2007/0183497 A1    Aug. 9, 2007

(51) Int. Cl.
*H04N 3/36* (2006.01)
*H04N 5/14* (2006.01)

(52) U.S. Cl. .................. 375/240.16; 348/700
(58) Field of Classification Search .......... 375/240, 375/240.12, 240.15, 240.16, 240.26; 348/700–701; 715/723–726, 700–701; 386/38, 49–50, 386/107, 110, 117, 120, 137, 207.99, 211.9; 382/107
See application file for complete search history.

(56) References Cited

U.S. PATENT DOCUMENTS

| 5,793,886 | A * | 8/1998 | Cok .................. 382/169 |
| 6,122,320 | A * | 9/2000 | Bellifemine et al. ........ 375/240 |
| 6,549,643 | B1 * | 4/2003 | Toklu et al. .................. 382/107 |
| 6,584,155 | B2 * | 6/2003 | Takeda et al. .......... 375/240.16 |
| 6,721,454 | B1 * | 4/2004 | Qian et al. .................. 382/224 |
| 7,612,832 | B2 * | 11/2009 | Zhang et al. ................ 348/700 |

| 2001/0016007 | A1 | 8/2001 | Wu et al. |
| 2002/0018594 | A1 * | 2/2002 | Xu et al. .................. 382/190 |

(Continued)

FOREIGN PATENT DOCUMENTS

EP    1 580 757    9/2005

OTHER PUBLICATIONS

Wolf, Key Frame Selection by Motion Analysis, 1996, IEEE International Conference on Acoustics, Speech, and Signal Processing, vol. 2, pp. 1228-1231.*
"A Stochastic Framework for Optimal Key Frame Extraction from MPEG Video Databases" by Yannis S. Avrithis et al., Computer Vision and Image Understanding, 75(1/2), 1999, pp. 3-24.

(Continued)

*Primary Examiner*—Tesfaldet Bocure
*Assistant Examiner*—Lawrence B Williams
(74) *Attorney, Agent, or Firm*—Raymond L. Owens

(57) ABSTRACT

A method of analyzing a digital video clip to determine candidate frames for subsequent key frame selection, includes: performing a global motion estimate on the video clip that indicates translation of a scene or camera, or scaling of the scene; and forming a plurality of video segments based on the global motion estimate and labeling each segment in accordance with a predetermined series of camera motion classes. The method further includes extracting key frame candidates from the labeled segments and computing a confidence score for each candidate by using rules corresponding to each camera motion class and a rule corresponding to object motion. An important feature of the invention is that the rules corresponding to camera motion include extracting a candidate frame for a pan segment with a confidence score related to a translation amount during the pan, and not extracting candidate frames for object motion based frames for fast pan and zoom segments, and the rule corresponding to object motion includes extracting a candidate frame for a fixed segment with a confidence score related to the segment length.

19 Claims, 6 Drawing Sheets

U.S. PATENT DOCUMENTS

| | | | |
|---|---|---|---|
| 2004/0088723 A1* | 5/2004 | Ma et al. | 725/19 |
| 2004/0136460 A1* | 7/2004 | Zhang et al. | 375/240.16 |
| 2005/0206751 A1* | 9/2005 | Manico et al. | 348/239 |
| 2005/0228849 A1* | 10/2005 | Zhang | 709/200 |
| 2006/0093040 A1* | 5/2006 | Zhang et al. | 375/240.16 |
| 2006/0193387 A1* | 8/2006 | Wu et al. | 375/240.16 |
| 2006/0257048 A1* | 11/2006 | Lin et al. | 382/276 |
| 2007/0182861 A1* | 8/2007 | Luo et al. | 348/700 |
| 2007/0237225 A1* | 10/2007 | Luo et al. | 375/240.12 |

OTHER PUBLICATIONS

"A Novel Video Key Frame Extraction Algorithm" by T. M. Liu, et al., IEEE Trans. Cir. Sys. Video Techno, 13(10), 2003, pp. 1006-1013.

"Automatically Extracting Highlights for TV Baseball Programs" by Yong Rui et al., ACM Multimedia 2000, pp. 105-115.

"Event Detection and Summarization in Sports Video" by Baoxin Li et al., IEEE Workshop on Content-based Access of Image and Video Libraries (CBAIVL), 2001, pp. 132-140.

"Robust Multiresolution Estimation of Parametric Motion Models Applied to Complex Scenes" by Jean-Marc Odobez et al., IRISA Campus Universitaire de Beaulieu, ISSN 1166-8687.

* cited by examiner

| CLASS | CANDIDATE(S) FROM CAMERA MOTIONS | CANDIDATE(S) FROM OBJECT MOTIONS | CAMERA MOTION-BASED RULES |
|---|---|---|---|
| ZOOM IN | YES | NO | END OF SEGMENT |
| ZOOM OUT | YES | NO | END OF SEGMENT |
| PAN | YES | YES | CUMUL. DIST. & LOCAL MINIMUMS |
| FIXED (STEADY) | YES | YES | MIDDLE OF SGMT. |

EXTRACTING KEY FRAME CANDIDATES FROM VIDEO CLIP

CROSS REFERENCE TO RELATED APPLICATIONS

The present application is related to U.S. patent application Ser. No. 11/347,679, filed Feb. 3, 2006 entitled "ANALYZING CAMERA CAPTURED VIDEO FOR KEY FRAMES" by Jiebo Luo, Christophe Papin, Deniz Schildkraut and Majid Rabbani.

FIELD OF THE INVENTION

The invention relates generally to the field of digital image processing and, more particularly, to a method usable in extracting a key frame from a video clip.

BACKGROUND OF THE INVENTION

Extracting key frames (KF) from video is of great interest in many application areas. Main usage scenarios include printing from video (select or suggest the best frames to be printed), video summary (e.g. watch a wedding movie in seconds), video compression (optimize key frames quality when encoding), video indexing, video retrieval, and video organization. In general, key frames should show good quality and high semantic interest. However, what exactly is a key frame sometimes depends on the application. The level of requirement can also be different. For printing still pictures from video, one needs to put a strong focus on image quality. For rapid browsing one will need to increase the representativeness in semantics. Key frame extraction can be a feature offered in a camera (including a digital camera, camcorder, and camera phone), in desktop image/video editing/management software, and with online image/video service.

Key frame extraction is not a new problem. However, prior art has been focused on sports or news video with constrained structures. Such video conforms to well-defined common structures and characteristics. For instance, in field sports (including soccer, football, baseball, rugby, and cricket), there are two opposing teams and referees in distinct colorful uniforms, an enclosed playing area on grass or artificial turf, field lines and goals, commentator voice and spectator cheering, and finally, on-screen graphics (scoreboard). There are often a small number of canonic "views": field view, zoom-in, and close-up. Other types of sports, such as racquet sports, basketball, as well as news videos, share a different set of structured characteristics. More importantly, there is unambiguous ground truth as to which are the key frames within the given context. In contrast, even the themed consumer videos (e.g., wedding, birthday party) do not have the same level of common structures and characteristics, and the key frame selection is open to a high level of subjectivity because of observer association, sentimental values, and other factors.

In addition, image quality (contrast, exposure, camera shake) is rarely a concern for sports and news video because of superior imaging equipment and well-controlled imaging conditions. Example systems for extracting key frames from sports and news videos include Avrithis, Y. S., Doulamis, A. D., Doulamis, N. D., and Kollias, S. D., "A Stochastic Framework for Optimal Key Frame Extraction from MPEG Video Databases," Computer Vision and Image Understanding, 75(1/2), 1999, pp. 3-24; Liu, T., Zhang, H. J., and Qi, F., "A novel video key-frame-extraction algorithm based on perceived motion energy model," IEEE Trans. Cir. Sys. Video Techno, 13(10), 2003, pp. 1006-1013; Y. Rui, A. Gupta, and A. Acero, "Automatically extracting highlights for TV Baseball programs," ACM Multimedia 2000, pp 105-115; B. Li and M. I. Sezan, "Event Detection and Summarization in Sports Video," IEEE Workshop on Content-based Access of Image and Video Libraries (CBAIVL), 2001, pp. 132-140.

Short movie clips captured by a digital camera with video capabilities (a recent product feature) are different. The variety in occasions and situations for consumer videos is unconstrained. Contrary to professional videos, there are no special effects, no tightly pre-defined structure, no professional editing, and a video clip represents only one shot. In that sense, video summary from a short clip is potentially easier than for those recorded by a camcorder because one does not need to perform video shot segmentation. Camera shake is often present and exposure is often problematic compared to professional videos. Above all, the biggest challenge with consumer video is its unconstrained content and lack of structure. Tong Zhang, in US patent application publication US 2005/0228849, "intelligent key-frame exaction from a video", described a method for intelligent key frame extraction for consumer video printing based on a collage of features including accumulative color histogram, color layout differences, camera motion estimation, moving object tracking, face detection and audio event detection. Specifically, Zhang disclosed a method for extracting a set of key-frames from a video, comprising the steps of: selecting a set of candidate key-frames from among a series of video frames in the video by performing a set of analyses on each video frame, each analysis selected to detect a meaningful content in the video; arranging the candidate key-frames into a set of clusters; selecting one of the candidate key-frames from each cluster in response to a relative importance of each candidate key-frame.

Because the application of key frame extraction can vary significantly, for example, in terms of the desired number of key frames, it is often desirable to implement a flexible framework capable of producing a scalable video representation. The optimal number of relevant key frames is highly dependent on the video complexity. Complexity is a function of many features: camera motion, scene content, action and interaction between moving objects, image quality (IQ) due to lightning and camera setting, and so on. The video duration is also a parameter that could drive the video complexity: a longer movie clip is likely to contain more events and therefore demands more key frames.

One also need to define the best criteria of representativeness, and then determine what features can be used to obtain the 'best' key frames given the input data. Different features, such as those used in US 2005/0228849, vary significantly in terms of their effectiveness and computational cost. It is desirable to use as fewer features as possible to achieve a reasonable performance with reasonable speed.

Furthermore, because video clips taken by consumers are unstructured, one should rely only on cues related to the cameraman's general intents, i.e., camera and object motion descriptors. Rules applicable only to specific content only have limited use and need advance information about the video content.

Consequently, it would be desirable to design a system that is reliable, efficient, regardless of the image content.

SUMMARY OF THE INVENTION

The present invention is directed to overcoming one or more of the problems set forth above. A method according to the present invention analyzes a digital video clip to determine candidate frames for subsequent key frame selection, by:

a. providing a camera motion sensor in the camera so that information is provided during image capture regarding camera motion including translation of the scene or camera, or scaling of the scene;

b. forming a plurality of video segments based on the global motion estimate and labeling each segment in accordance with a predetermined series of camera motion classes; and c. extracting key frame candidates from the labeled segments and computing a confidence score for each candidate by using rules corresponding to each camera motion class and a rule corresponding to object motion.

One aspect of the present invention, focuses on motion-based descriptors as the most effective and efficient features. Camera and object motions are estimated and used to derive a set of motion descriptors. The video clip is divided into a set of homogeneous segments based on the major types of camera motion (pan, zoom ... ). Dedicated rules allow candidate key frames to be extracted from each segment. The use of complementary descriptors based on image quality (IQ) or semantic analysis (e.g., skin, face or expression) would enable more satisfactory results at an additional expense.

An important feature of the invention is ranking candidates. A confidence score is attached to each candidate and is later used to rank all candidates in an order of relevance. This leads to a scalable framework such that we are able to obtain an arbitrary subset of key frames from candidates given the need of a particular application.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 3 shows a summary of the rules for key frame extraction in response to the camera motion classification of the present invention;

DETAILED DESCRIPTION OF THE INVENTION

Because many basic image and video processing algorithms and methods are well known, the present description will be directed in particular to algorithm and method steps forming part of, or cooperating more directly with, the method in accordance with the present invention. Other parts of such algorithms and methods, and hardware or software for producing and otherwise processing the video signals, not specifically shown, suggested or described herein can be selected from such materials, components and elements known in the art. In the following description, the present invention will be described as a method typically implemented as a software program. Those skilled in the art will readily recognize that the equivalent of such software can also be constructed in hardware. Given the system as described according to the invention in the following materials, software not specifically shown, suggested or described herein that is useful for implementation of the invention is conventional and within the ordinary skill in such arts.

It is instructive to note that the present invention utilizes a digital video which is typically either a temporal sequence of frames, each of which is a two-dimensional array of red, green, and blue pixel values or an array of monochromatic values corresponding to light intensities. However, pixel values can be stored in component forms other than red, green, blue, can be compressed or uncompressed, and can also include other sensory data such as infrared. As used herein, the term digital image or frame refers to the whole two-dimensional array, or any portion thereof that is to be processed. In addition, the preferred embodiment is described with reference to a typical video of 30 frames per second, and a typical frame resolution of 480 rows and 680 columns of pixels, although those skilled in the art will recognize that digital videos of different frame rates and resolutions can be used with equal, or at least acceptable, success. With regard to matters of nomenclature, the value of a pixel of a frame located at coordinates (x,y), referring to the $x^{th}$ row and the $y^{th}$ column of the digital image, shall herein comprise a triad of values $[r(x,y), g(x,y), b(x,y)]$ respectively referring to the values of the red, green and blue digital image channels at location (x,y). In addition, a frame is identified with a time instance t.

Figure 1:
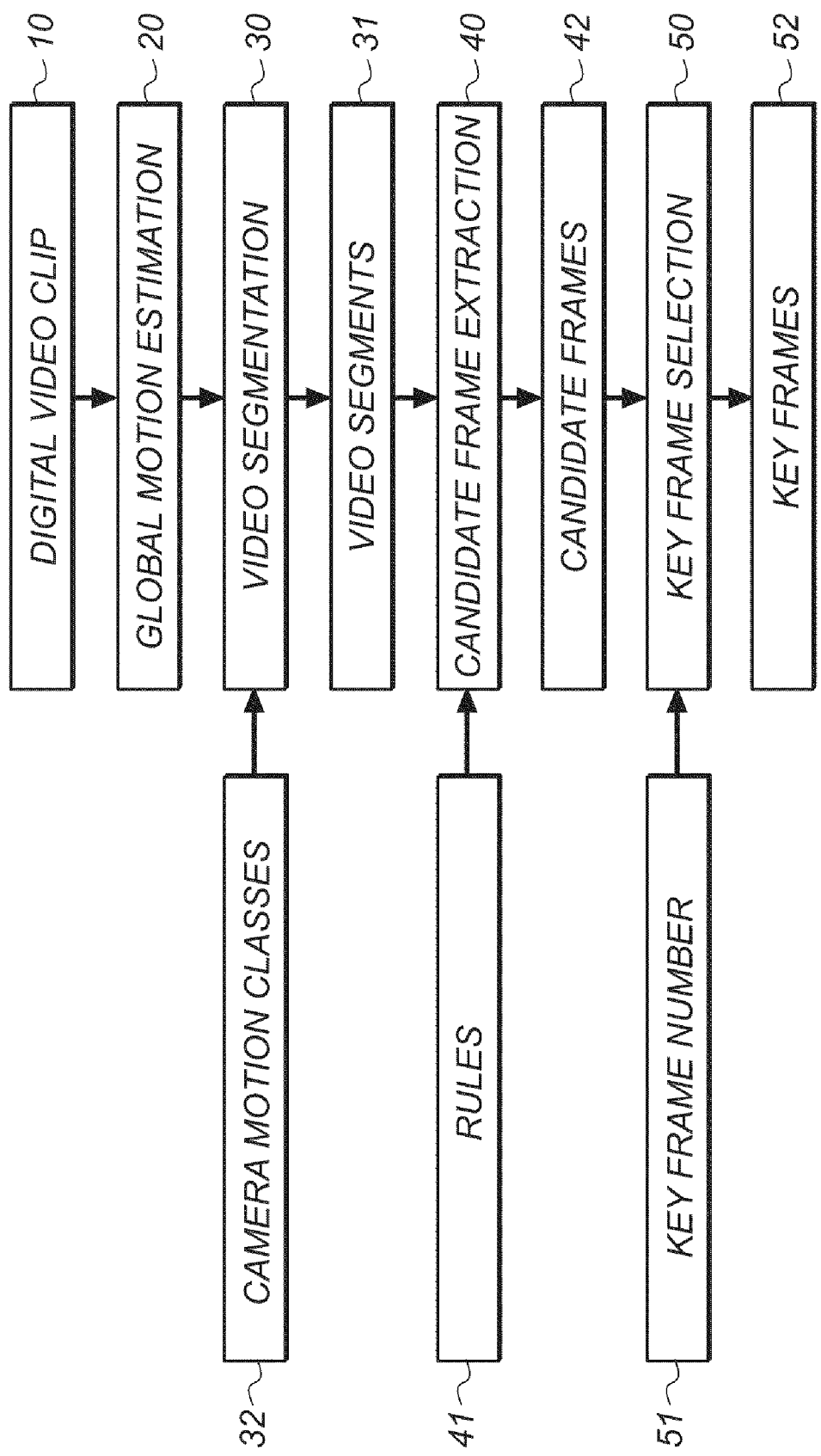
FIG. 1 is a block diagram illustrating an overview of the key frame extraction method according to the present invention.

Referring to FIG. 1, there is shown an overview block diagram of the present invention. An input video clip 10 first undergoes global motion estimation 20. Based on the estimated global motion, the video clip 10 is then divided through video segmentation 30 into a plurality of segments (which may or may not overlap), each segment 31 corresponding to one of a pre-determined set of camera motion classes 32, including pan (left or right), tilt (up or down), zoom-in, zoom-out, fast pan, and fixed (steady). For each segment 31, key frame candidate extraction 40 is performed according to a set of pre-determined rules 41 to generate a plurality of candidate key frames 42. For each candidate frame, a confidence score (not shown) is also computed to rank all the candidates 42 in an order of relevance. Final key frame selection 50 is performed according to a user-specified total number 51 and the rank ordering of the candidates. In a preferred embodiment of the present invention, the final key frames 52 include at least the highest ranked frame in each segment 31.

Because video clips taken by consumers are unstructured, rules applicable only to specific content only have limited use and also need advance information about the video content for them to be useful. In general, one can only rely on cues related to the cameraman's general intents. Camera motion, which usually corresponds to the dominant global motion, allows a prediction of the cameraman's intent. A "zoom in" indicates that he has an interest in a specific area or object. A camera "pan" indicates tracking a moving object or scanning an environment. Finally, a rapid pan can be interpreted as a lack of interest or a quick transition toward a new region of interest (ROI). The secondary or local motion is often an indication of object movements. These two levels of motion description combine to provide a powerful way for video analysis.

In a preferred embodiment of the present invention, the algorithm by J.-M. Odobez and P. Bouthemy, "Robust Multiresolution Estimation of Parametric Motion Models," J. Vis. Comm. Image Rep., 6(4):348-365, 1995, is used in global motion estimation 20 as a proxy for the camera motion. The method is summarized here. Let θ denote the motion-based description vector. Its first 3 components correspond to the camera motion and are deduced from the estimation of a 6-parameter affined model that can account for zooming and rotation, along with simple translation. This descriptor relies on the translation parameters $a_1$ and $a_2$, and the global divergence (scaling) div. The last descriptor evaluates the amount and the distribution of secondary motion. We refer to secondary motion as the remaining displacement not accounted for by the global motion model. Such spatio-temporal changes are mainly due to objects moving within the 3D scene. The Displaced Frame Difference (DFD) corresponds to the residual motion once the camera motion is compensated. We also combine spatial information (the average distance of the secondary motion to the image center) and the area percentage of the secondary motion. The fourth component of θ is given by:

$$obj = \omega_{dtc} \cdot \frac{1}{N_\Lambda} \sum_{p \in \Lambda} th_{Hyst}[|DFD(p)|] \quad (1)$$

The function $th_{Hyst}$ relies on a hysteresis threshold, $N_\Lambda$ is the number of active pixels p, and the normalized linear function $\omega_{dtc}$ favors centrally located moving areas.

Figure 2:
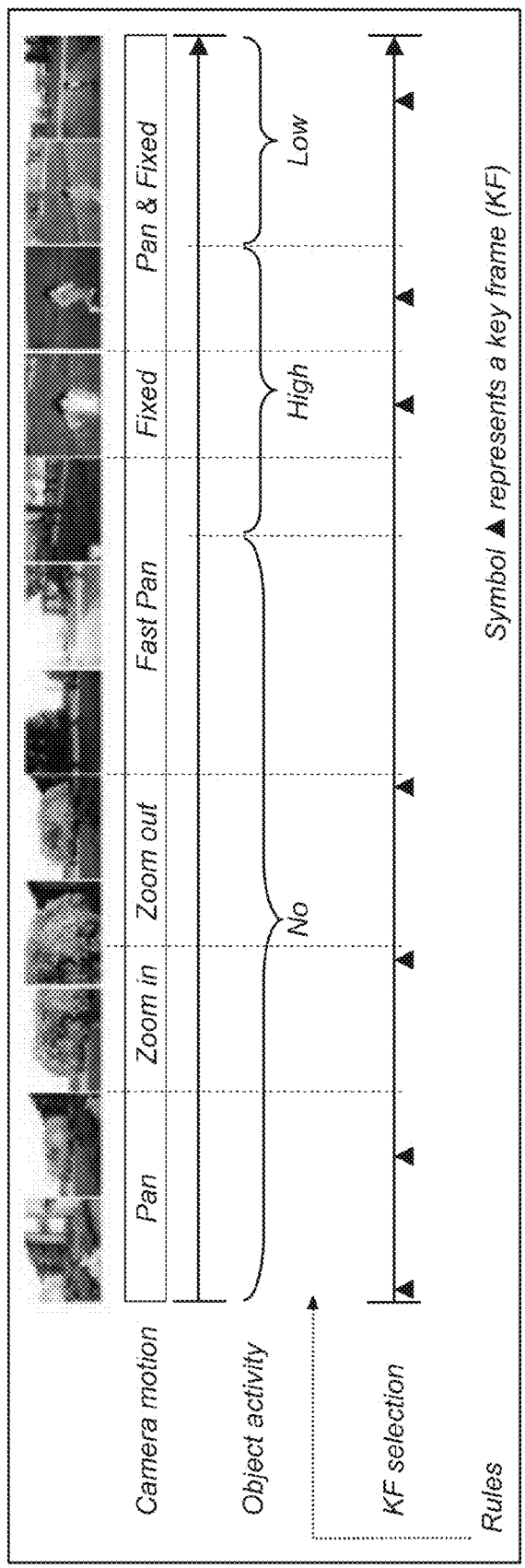
FIG. 2 shows an illustration of a video clip containing several camera motion classes and object motion classes, along with desired key frame extraction in response to such motion, in accordance with the interpolation detection method shown in FIG. 1.

A video can be characterized in terms of camera motion and object motion. Camera motion is fairly continuous and provides a meaningful partition of a video clip into homogeneous segments in step 30 of FIG. 1. Object activity is an unstable but still useful feature. Referring to FIG. 2, this example video clip consists of the following sequence of camera motion: pan (environment), zoom-in, zoom-out, fast pan, fixed, pan (tracking object), and fixed. Note that a "zoom in" can be caused by a mechanical/optical action from the camera, by the motion of the cameraman (towards the object), or by the movement of the object (towards the camera). However, they are equivalent from an algorithm prospective as "apparent" zoom-in.

As for object motion, the example video clip in FIG. 2 consists of the following sequence of object motion: no object motion, high object motion, and finally low object motion. Note that the boundaries of the object motion segments do not necessarily coincide with the boundaries of the camera motion.

Continuing the reference to FIG. 2, according to the present invention, rules are formulated and confidence functions are defined to select candidate frames for each segment in step 40 of FIG. 1. For the first segment, which is a pan, it would be desirable to select two key frames to span the environment (as marked). For the subsequent zoom-in and zoom-out segments, a key frame should be selected at the end of each segment when the zooming action stops. It is usually not necessary to extract a key frame for the fast pan segment because it is merely transition without any attention paid. Although object motion starts during the latter stage of the fast pan, it is only necessary to extract key frames once the camera becomes steady. One key frame should be extracted as the camera pans to follow the moving object. Finally, as the object moves away from the steady camera, another key frame is selected.

The rules used in the above example are of a general purpose in nature. They do not rely on any semantic information on what the object is, what the environment is, or what the object motion is. Therefore, they can be applied to any other video clips. These generic rules are summarized in FIG. 3.

The present invention distinguishes four camera motion-based classes: "pan," "zoom in," "zoom out," and "fixed." Note that "tilt" is handled in the same way as "pan" and is treated as the same class (without straightforward modification). Also note that the descriptor obj is not used during video segmentation, which involves applying adaptive thresholds to the scaling and translation curves over time (per the 6-parameter model). In the following, detailed descriptions are provided for each camera motion class.

A slow camera pan takes more time to scan a significant area. It seems appropriate to make the segmentation threshold depend on the pan segment's length l, but it is a chicken-and-egg problem because one needs to segment the translation data first to know the length itself. To overcome this problem, a small translation threshold value is used to provide a rough segmentation. There would be no need to extract a pan segment if the camera view does not change significantly. The adaptive threshold $th_{pan}$ is lower when dealing with longer pan. In a preferred embodiment of the present invention, $th_{pan}$ is defined as the unit amount of camera translation required to scan a distance equal to the frame width w multiplied by a normalized coefficient γ that represents a value beyond which the image content is considered to be different enough.

There exists a strong redundancy over time. To save computing time, it is advantageous not to estimate motion for every frame. Instead, a constant temporal sampling rate is maintained over time regardless of the capture frame rate. Let $t_s$ denote the temporal subsampling step (the capture frame rate divided by a fixed number of frame samples per second). The time reference attached to the video is denoted as $\mathfrak{R}_0$ and represents the physical time. The second time reference, denoted $\mathfrak{R}_1$, is related to the subsampled time. Thus, $$l' \cdot t_s \cdot th_{pan} = \gamma \cdot w \quad (2)$$

The number of frames N is equal to $l' \cdot t_s$, where the duration l' is considered in $\mathfrak{R}_1$. Finally, the adaptive threshold is $$th_{pan} = \frac{\gamma \cdot w}{l' \cdot t_s} \quad (3)$$

A similar method is used to segment the scaling curve. In this case, there is no need to consider a minimal distance to cover but instead a minimum zoom factor. If the scaling process is short, its amplitude must be high enough to be considered. In reference $\mathfrak{R}_1$, the scaling factor is generalized to $$f_{zoom} = \prod_{t \in l'} [1 + div(t)]^{t_s} \quad (4)$$

If div(t) is assumed to be the threshold $th_{zoom}$ and constant over time, this expression can be compared to a desired total scaling factor $\gamma_s$, reflecting the entire zoom motion along a given segment of length l':

$$([1 + th_{zoom}]^{t_s})^{l'} = \gamma_s \quad (5)$$

Therefore, the adaptive zoom threshold is given by $$th_{zoom} = \exp\left(\frac{\ln \gamma_s}{l^r t_s}\right) - 1 \qquad (6)$$

The KF candidates form a fairly large set of extracted frames, each of which is characterized by a confidence value. Although such a value differs from camera motion class to class, it is always a function of the descriptor's robustness, the segment's length, the motion descriptor's magnitude, and the assumptions on the cameraman's intent.

In the present invention, high-level strategies are used to select candidates. They are primarily based on domain knowledge. A zoom-in camera operation generally focuses on a ROI. It can be caused by a mechanical/optical action from the camera, movement of the cameraman, or movement of the object. These scenarios are equivalent from the algorithm's perspective as apparent zoom-in. It is desirable to focus on the end of the motion when the object is closest.

Typically, a camera pan is used to capture the environment. Tracking moving objects can also cause camera translations similar to a pan. One way to differentiate between the two scenarios is to make use of the object motion descriptor obj. However, its reliability depends on the ability to compensate for the camera motion. KF candidates are extracted based on the local motion descriptor and the global translation parameters. Camera motion-dependent candidates are obtained according to a confidence function dependent on local translation at a minimal and cumulative panning distance. Other candidates are frames with large object motion.

Finally, for a "fixed" or steady segment, in one embodiment of the present invention, it is reasonable to simply choose the frame located at the midpoint of the segment. Preferred embodiments should use information from additional cues, including image quality (e.g., sharpness, contrast) or semantic descriptors (e.g. facial expression) to select the appropriate frame.

In a preferred embodiment of the present invention, the main goal is to span the captured environment by a minimum number of KF. Because scene content in a consumer video is rarely static, one also needs to consider large object motion. Covering the spatial extent and capturing object motion activity are quite different in nature, and it is nontrivial to choose a trade-off between them. Certainly, a lack of object motion signifies that the cameraman's intent was to scan the environment. In addition, a higher confidence score is assigned to candidates based on the cumulative distance.

Figure 4:
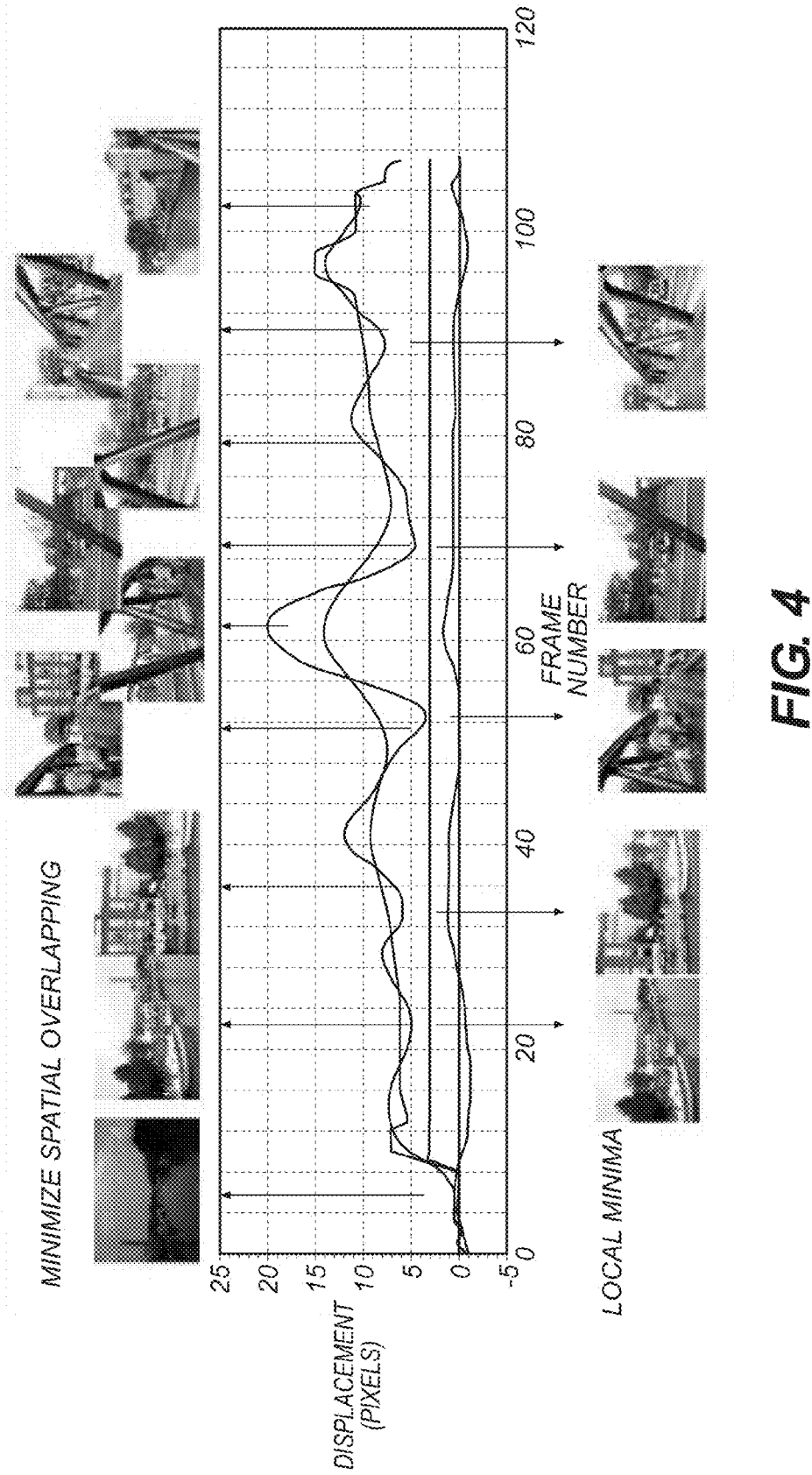
FIG. 4 shows an illustration of a video clip for candidate extraction from a pan segment.

To reduce spatial overlap, a probability function $d_{spat}$ is formulated as a function of the cumulative camera displacements. It is null at the segment's onset and increases as a function of the cumulative displacements. The scene content is judged different enough when $d_{spat}$ reaches 1. Once $d_{spat}$ reaches 1, its value is reset to 0 before a new process starts again to compute the cumulative camera displacements. To avoid a sharp transition, its value decreases rapidly according to a Gaussian law to 0 (for instance within the next 3 frames). Note that the cumulative camera displacement is approximated because the camera motion is computed only every $t_s$ frames. FIG. 4 shows top candidate frames extracted by using only $d_{spat}$. Each frame contains distinct content, i.e., to miss any one of them would be to miss part of the whole landscape.

It is worthwhile considering the cameraman's subtler actions. It is noticed that a pause or slow-down in pan often indicates a particular interest, as shown in FIG. 4. It makes sense to assign higher importance to such areas that are local translation minima using the probability function $d_{know} = G(\mu, \sigma)$, where the function G is a Gaussian function, with $\mu$ as the location of local minimum and u the standard deviation computed from the translation curve obtained upon global motion estimation. Example candidate frames extracted from function $d_{know}$ are shown in FIG. 4. Because the candidate frames obtained from $d_{spat}$ and $d_{know}$ can be redundant, one needs to combine $d_{spat}$ and $d_{know}$ using a global confidence function $d_{pan}$:

$$d_{pan} = a_1 d_{spat} + a_2 d_{know} \qquad (7)$$

with $a_1 + a_2 = 1$, such that $d_{pan}$ lies between 0 and 1. Typically, one does not favor either criterion by selecting $a_1 = a_2 = 0.5$.

Referring to FIG. 4, candidates are extracted from a pan segment where the pan speed is not constant (as indicated by the ups and downs in the camera translation curve in the middle row). In the top row, six frames are extracted to span the environment while reducing their spatial overlap. In the bottom row, additional five frames are selected according to the minimum points in the translation curve.

Figure 5:
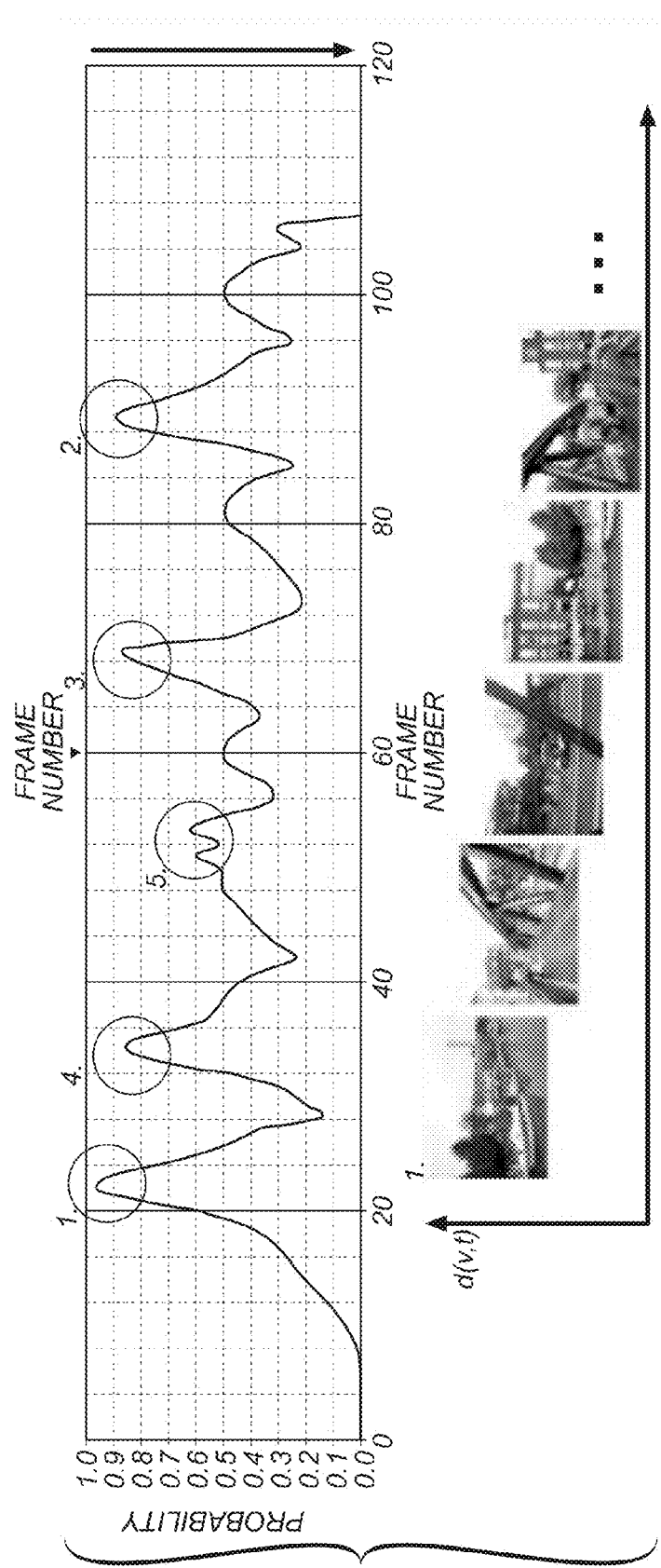
FIG. 5 shows an illustration of a video clip for candidate extraction from a pan segment containing pauses in camera motion.

Referring now to FIG. 5, there is shown an example of the function $d_{pan}$, with candidates extracted from a pan segment. Confidence values $d_{pan}$ are used to rank candidate frames. Modes between 0 and 0.5 only display a high percentage of new content, while modes with values greater than 0.5 correspond to a high percentage of new content and are also close to a translation minimum (pan pause). Function $d_{pan}$ enables us to rank such candidate frames.

Fast pan represents either a transition toward a ROI or the tracking of an object in fast motion. In both cases, frames contain severe motion blur and therefore are not useful. It makes sense not to extract KF from such segments. A normalized confident coefficient c based on the translation values is introduced. In a preferred embodiment of the present invention, the coefficient c is reshaped by a sigmoid function:

$$c(\omega) = \frac{1}{1 + e^{4k(\omega - th_{High})}}. \qquad (8)$$

where k is the slope at the translation threshold $th_{high}$, and $c(th_{high}) = 0.5$. The coefficient c acts as a weighting factor for $d_{pan}$:

$$d_{pan} = c(\omega) \lfloor a_1 d_{spat} + a_2 d_{know} \rfloor \qquad (9)$$

The coefficient c is close to 1 for small translation, decreases around $th_{high}$ according to the parameter k, and eventually approaches 0 for large translations.

Candidate selection from a zoom segment is driven by domain knowledge, i.e., KF should be at the end of a zoom segment. The confidence function $d_{zoom}$ can be affected by translation because large pan motion often causes false scaling factor estimates. Similarly to Eq. 8, let $c_{pan}$ denote a sigmoid function that features an exponential term based on the difference between the Euclidian norm of the translation component $\omega_0(t)$, t being the time associated with the maximal zoom lying within the same segment of the candidate key frame, and a translation parameter $tr_{Max}$ (which can be different from $th_{high}$).

The coefficient $c_{pan}$ provides a measure of the decrease in the confidence of the scaling factor when large pan occurs. A high zoom between two consecutive frames is unlikely due to the physical limits of the camera motor. Even though an object might move quickly toward the camera, this would result in motion blur. In a preferred embodiment of the present invention, the maximal permitted scaling factor $th_s$ between two adjacent frames is set to 0.1 (10%), and the $f_{zoom}$ factor introduced in Eq. 4 is modified to:

$$f_{zoom} = \prod_{t \in l'} \Xi(1 + div(t), th_s)[1 + div(t)]^{t_s - 1} \quad (10)$$

where the step function is $\Xi(x, a)=$ $$\Xi(x, a) = \begin{cases} 0 & \text{if } x \geq a \\ x & \text{if } x < a \end{cases}.$$

Finally, after applying normalization function N, Eq. 10 can be rewritten as $$f_{zoom} = \prod_{t \in l'_k} N(\Xi[1 + div(t)][1 + div(t)]^{t_s}) \quad (11)$$

and the confidence function $d_{zoom}$ for a zoom candidate is $$d_{zoom} = c_{pan} f_{zoom} \quad (12)$$

Figure 6:
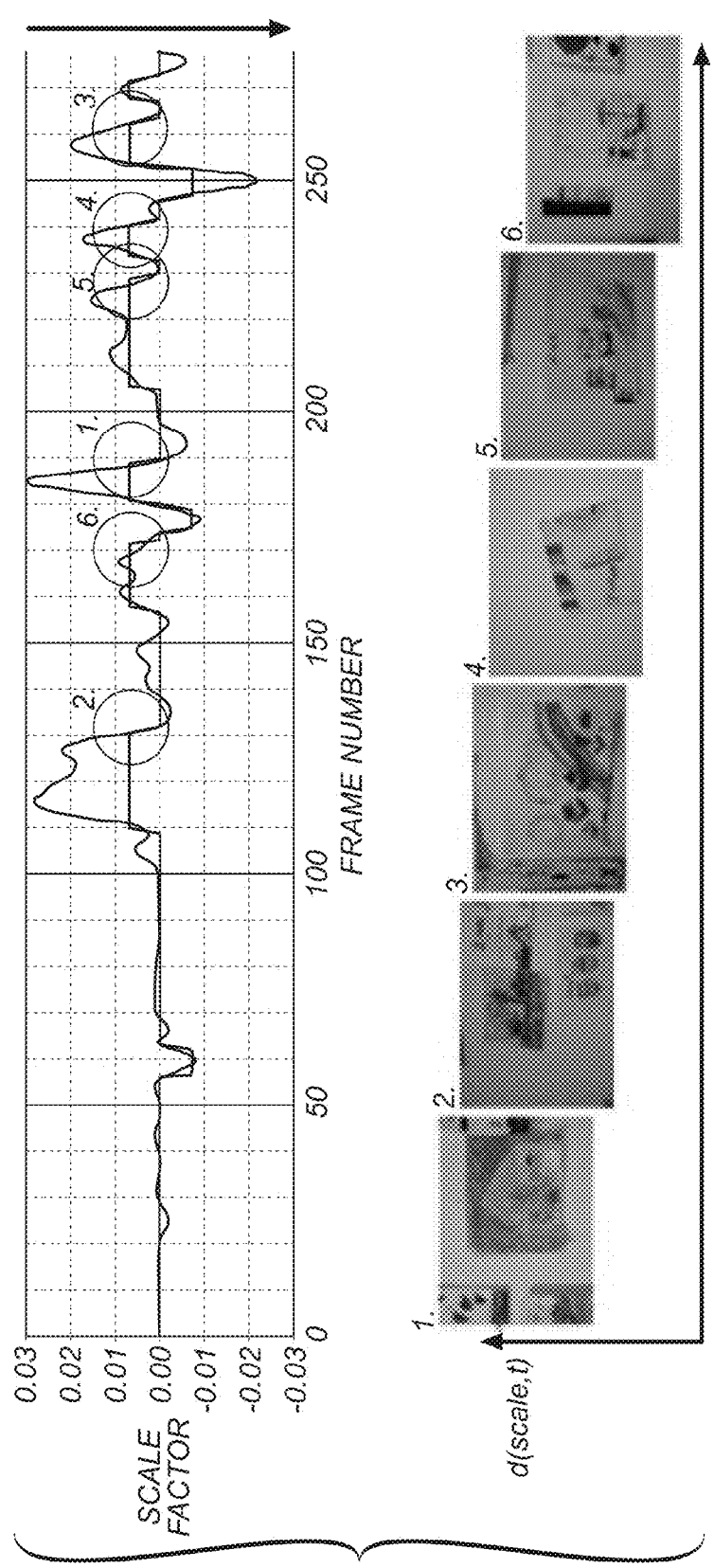
FIG. 6 shows an illustration of a video clip for candidate extraction from a zoom-in segment.

Referring now to FIG. 6, there is shown an example of candidate extraction from a series of zoom-in segments. The top row is the plot for (apparent) camera scaling. The bottom row displays the candidate frames rank ordered according to the confidence function $d_{zoom}$. The actual locations of these candidates are marked in the scaling curve.

Zoom-out segment is processed in a similar fashion, where candidates are extracted at the end of the segment. However, even though a zoom-out operation could be of interest because it captures a wider view of the environment, extracting a candidate key frame from a zoom-out segment is often redundant. The subsequent segment generally contains frames with similar content. In the present invention, a single candidate frame is extracted at the end of a zoom-out segment, but it will be compared to the key frame(s) extracted in the next segment to remove any redundancy. To confirm any redundancy, the simplest metrics are histogram difference and frame difference. In a preferred embodiment of the present invention, each frame is partitioned into the same number L of blocks of size M×N, color moments (mean and standard deviation) are computed for each block. The corresponding blocks are compared in terms of their color moments. Two blocks are deemed similar if the distance between the color moments is below a pre-determined threshold. Two frames are deemed similar if the majority (e.g., 90%) of the blocks are similar.

Candidates are also selected based on object motion activity, which can be inferred from the remaining displacement (secondary motion) that is not accounted for by the global motion model. Such spatio-temporal changes are mainly due to objects moving within the 3D scene. Large object motion is often interesting. Therefore, local maximum values of the descriptor obj provide a second set of candidates. Note that their reliability is often lower, compared to camera motion-driven candidates. For example, high "action" values can occur when motion estimation fails and do not necessarily represent true object motion.

There are at least two ways of quantifying secondary motion. One can use the final data values after the M-estimator to compute the deviation from the estimated global motion model, as taught by J.-M. Odobez and P. Bouthemy. Another way is to compensate each pair of frames for the camera motion. Motion compensation is a way of describing the difference between consecutive frames in terms of where each section of the former frame has moved to. The frame I at time t+dt is compensated for the camera motion and object motion is given by Eq. 1.

The confidence function for object motion in a "fixed" segment is a function of its length. A long period without camera motion indicates particular interest of the cameraman. First, the segment length $l_{fix}$ (in reference $\mathfrak{R}_1$) is rescaled as a percentage of the total video duration such that $l_{fix} \in [0, 100]$. Moreover, it seems reasonable to assume that the gain in interest should be higher from a 1-second to a 2-second segment, than between a 10- and a 12-second segment. In other words, the confidence function $d_{fix}(obj)$ increases in a non-linear fashion. In a preferred embodiment of the present invention, this observation is modelled by x/(1+x). Therefore, $$d_{fix}(obj) = \frac{l_{fix} \cdot obj}{1 + (l_{fix} \cdot obj)} \quad (13)$$

The confidence value for object motion in a "pan" segment is generally lower because the object motion is in the presence of large camera motion. The confidence score is related to the translation amount during the pan: higher confidence is generally associated to object motion-based candidates during small translation. In a preferred embodiment of the present invention, a similar function is used with modification:

$$d_{pan}(obj) = \frac{10 \frac{a_i}{th_{pan}} \cdot obj}{1 + \left(10 \frac{a_i}{th_{pan}} \cdot obj\right)} \quad (14)$$

where the index i of the translation parameter a is either 1 or 2 (for the horizontal and vertical axes).

The confidence value for object motion in a "zoom" segment is set to zero because object motion within a zoom segment is highly unreliable. Therefore, $d_{zoom}(Obj)=0$ and no candidate is extracted based on object motion.

Although the present invention is embodied primarily using camera motion and object motion cues, those skilled in the art can use complementary descriptors, such as image quality (IQ), semantic analysis (e.g., skin, face, or expression) to improve the results at additional expense, without deviating from the scope of the present invention.

In the last step 50 of FIG. 1, final key frames 52 are selected from the initial candidates 42. The confidence value of each candidate enables rank ordering. To space out KF, at least one key fame (the highest ranked candidate) is extracted per segment unless its confidence value is too low. To fill in the user-specified number of key frames $N_{KF}$, the remaining candidates with the highest confidence values are used. If two candidates are too close in value, only the one with the higher confidence value is retained. Preferred embodiments should use information from additional cues, including image quality (e.g., sharpness, contrast) or semantic descriptors (e.g. facial expression) to select the appropriate frame.

The present invention has been described with reference to a preferred embodiment. Changes can be made to the preferred embodiment without deviating from the scope of the present invention. Such modifications to the preferred embodiment do not significantly deviate from the scope of the present invention.

PARTS LIST 10 input digital video
20 global motion estimation
30 video segmentation
31 video segments
32 camera motion classes
40 candidate frame extraction
41 rules
42 candidate frames
50 key frame selection
51 key frame number
52 key frames

What is claimed is:

1. A method of analyzing a digital video clip to determine candidate frames for subsequent key frame selection, comprising:
   a. performing a global motion estimate on the video clip that indicates translation of a scene or camera, or scaling of the scene;
   b. forming a plurality of video segments based on the global motion estimate and labeling each segment in accordance with a predetermined series of camera motion classes;
   c. extracting key frame candidates from the labeled segments and computing a confidence score for each candidate by using rules corresponding to each camera motion class and a rule corresponding to object motion; and
   d. wherein, the rules corresponding to camera motion include extracting a candidate frame for a pan segment with a confidence score related to a translation amount during the pan, and not extracting candidate frames for object motion based frames for fast pan and zoom segments, and the rule corresponding to object motion includes extracting a candidate frame for a fixed segment with a confidence score related to the segment length.

2. The method of claim 1 wherein the predetermined camera motion classes include pan (left or right, and tilt up or down), zoom (in or out), fast pan or fixed.

3. The method of claim 2 wherein the rules include a pan rule, a zoom rule, a fast pan rule and a fixed rule.

4. The method of claim 3 wherein the pan rule includes extracting a plurality of frames to cover the space of environment while reducing the spatial overlap among the frames from a pan segment.

5. The method of claim 3 wherein the pan rule includes extracting a frame located at a point when the pan motion is slowed down.

6. The method of claim 3 wherein the zoom rule includes extracting a candidate frame at an endpoint of the zoom-in or zoom-out segment.

7. The method of claim 3 wherein the fast pan rule includes not extracting a candidate frame from a fast pan segment.

8. The method of claim 3 wherein the fixed rule includes extracting a candidate frame located at a midpoint of a fixed segment.

9. A method of analyzing a digital video clip to determine key frames, comprising:
   a. performing a global motion estimate on the video clip that indicates translation of a scene or camera, or scaling of the scene;
   b. forming a plurality of video segments based on the global motion estimate and labeling each segment in accordance with a predetermined series of classes;
   c. extracting key frame candidates from the labeled segments and computing a confidence score for each candidate by using rules associated with each label;
   d. wherein, the rules for labels corresponding to camera motion include extracting a candidate frame for a pan segment with a confidence score related to a translation amount during the pan, and not extracting candidate frames for object motion based frames for fast pan and zoom segments, and the rule for labels corresponding to object motion includes extracting a candidate frame for a fixed segment with a confidence score related to the segment length; and
   e. selecting key frames from the candidate frames based on the confidence score of each candidate.

10. The method of claim 9 further including ranking the selected key frames in accordance with the confidence score.

11. The method of claim 10 wherein step d includes employing the ranking and a user specified number to select the key frames.

12. The method of claim 11 wherein employing the ranking and a user specified number to select the key frames includes selecting at least one key frame from each segment if there are confidence scores above a predetermined threshold.

13. The method of claim 12 wherein employing the ranking and a user specified number to select the key frames includes selecting key frames from the remaining candidates with the highest confidence values to fill the user specified number of key frames.

14. The method of claim 9 wherein the predetermined series of classes include pan (left or right, and tilt up or down), zoom (in or out), fast pan or fixed.

15. The method of claim 14 wherein the rules include a pan rule, a zoom rule, a fast pan rule and a fixed rule.

16. The method of claim 15 wherein the pan rule includes extracting a plurality of frames to cover the space of environment while reducing the spatial overlap among the frames from a pan segment.

17. The method of claim 15 wherein the pan rule includes extracting a frame located at a point when the pan motion is slowed down.

18. The method of claim 15 wherein the zoom rule includes extracting a candidate frame at an endpoint of the zoom-in or zoom-out segment.

19. The method of claim 15 wherein the fixed rule includes extracting a candidate frame located at a midpoint of a fixed segment.

* * * * *